(12) United States Patent
Rider et al.

(10) Patent No.: US 9,481,205 B2
(45) Date of Patent: Nov. 1, 2016

(54) VEHICLE WHEEL

(71) Applicant: Weld Racing, LLC, Kansas City, MO (US)

(72) Inventors: Scott W. Rider, Lawson, MO (US); Joey R. Martin, Kansas City, MO (US)

(73) Assignee: Weld Racing, LLC, Kansas City, MO (US)

( * ) Notice: Subject to any disclaimer, the term of this patent is extended or adjusted under 35 U.S.C. 154(b) by 890 days.

(21) Appl. No.: 13/710,193

(22) Filed: Dec. 10, 2012

(65) Prior Publication Data

US 2013/0147255 A1 Jun. 13, 2013

Related U.S. Application Data

(60) Provisional application No. 61/568,589, filed on Dec. 8, 2011.

(51) Int. Cl.
*B60B 25/04* (2006.01)
*B60B 21/12* (2006.01)
*B60B 25/20* (2006.01)

(52) U.S. Cl.
CPC ........... *B60B 25/045* (2013.01); *B60B 21/125* (2013.01); *B60B 25/20* (2013.01); *B60B 2900/111* (2013.01); *B60B 2900/311* (2013.01); *B60B 2900/3312* (2013.01)

(58) Field of Classification Search
CPC ... B60B 25/045; B60B 21/125; B60B 25/20; B60B 2900/111
USPC ...................... 152/361.4, 399, 520
See application file for complete search history.

(56) References Cited

U.S. PATENT DOCUMENTS

| | | | |
|---|---|---|---|
| 939,638 A | 11/1909 | Rowling | |
| 2,576,736 A | 11/1951 | Watkins | |
| 3,024,830 A | 3/1962 | Bowersox | |
| 3,234,989 A | 2/1966 | Ruf | |
| 3,283,800 A | 11/1966 | Ischinger et al. | |
| 3,779,611 A | 12/1973 | Phillippe | |
| 3,966,535 A | 6/1976 | Abularach | |
| 4,168,732 A | 9/1979 | Monzini | |
| 4,206,797 A | 6/1980 | Holland, Sr. | |
| 4,502,521 A * | 3/1985 | Tavazza | B60B 21/10 152/375 |
| 4,505,314 A * | 3/1985 | Goudy | B60B 25/20 152/398 |
| 4,606,390 A * | 8/1986 | Shute | B60B 21/10 152/379.3 |
| 4,655,270 A | 4/1987 | Howind | |
| 4,989,657 A | 2/1991 | Lipper | |
| 5,275,471 A | 1/1994 | Nutzmann | |
| 5,320,420 A | 6/1994 | Gilliam | |
| 6,401,773 B1 | 6/2002 | Cho | |
| 6,773,077 B2 | 8/2004 | Buell et al. | |
| 7,458,648 B2 | 12/2008 | Esposito et al. | |
| 8,132,606 B2 * | 3/2012 | Gardetto | B60C 17/04 152/396 |
| 8,151,846 B2 * | 4/2012 | Lipper | B60B 3/08 152/379.5 |
| 8,196,629 B2 * | 6/2012 | Gardetto | B60C 15/028 152/401 |
| 2005/0161139 A1 * | 7/2005 | Mori | B60B 21/023 152/520 |
| 2009/0151876 A1 | 6/2009 | Rider | |
| 2010/0320830 A1 | 12/2010 | Rider | |

* cited by examiner

*Primary Examiner* — S. Joseph Morano
*Assistant Examiner* — Jean Charleston
(74) *Attorney, Agent, or Firm* — Erickson Kernell IP, LLC (57) ABSTRACT

The present invention provides a racing wheel with an improved beadlock to securely capture the bead of an attached tire, a decreased rotational movement of inertia, a stiffer inner and outer radial deflection of the inner and outer rings, a stiffer bearing load, a reduced lateral radial and/or combined run-out, a reduced number of leak paths and/or a reduction in the wheel weight.

14 Claims, 9 Drawing Sheets

VEHICLE WHEEL

CROSS REFERENCE TO RELATED APPLICATION

This application claims the benefit of application Ser. No. 61/568,589, filed Dec. 8, 2011, entitled VEHICLE WHEEL.

FIELD

The present invention relates to automotive wheels and, more particularly, to wheels for performance applications.

BACKGROUND

Racing wheels may be constructed of spun or forged aluminum or steel. In a drag racing application, the wheel may spin inside the tire due to the horsepower generated by the engine and applied to the tires. To secure the tires to the wheels, the tires are clamped to the rim of the wheel by a beadlock ring, which sandwiches the bead of the tire between the beadlock ring and the wheel rim, secured by bolts.

A beadlock is a feature found on a high-performance racing wheels. The beadlock secures the tire to the wheel to prevent the tire from slipping or rolling off of the wheel. In high-performance drag racing applications, a beadlock is located on both the inside and outside of the wheel.

With an increase in horsepower and speeds has come a phenomenon known as tire shake. The forces exerted by the engine through the drive shaft to the tire and wheel tend to force the tire off the wheel. The tire becomes distorted and causes severe vibration to the vehicle. Another result of increased horsepower and speeds is the tendency of the tire to be thrown off of the wheel by centrifugal force. As the tire spins, the shape of the tire is distorted away from the wheel and the bead of the tire is pulled inwardly off of the bead or rim of the wheel. A beadlock ring holds the bead of the tire in place locked to the rim of the wheel.

As the horsepower and speeds have increased however, the wheel assembly, rim, beadlock ring and fasteners have increased in weight requiring more power to turn the assembly. Because of the geometry of the lever arm of the beadlock, more fasteners and thus more weight is moved to the periphery of the wheel resulting in an increase in the rotational inertia of the wheel assembly. Further, to compensate for the increased forces applied by the more powerful engines, wheel assemblies have become heavier to accommodate the increased loads.

Typical manufacturing of prior art wheels are manufactured in parts with inner and outer parts that are assembled together by bolting or welding together. Welding may include lateral and radial run-out resulting in imbalanced products. Further, assemblies increase the potential and likelihood of leakage, which may result in catastrophic failure of a tire.

SUMMARY

The present invention may provide a racing wheel with an improved beadlock to securely capture the bead of an attached tire, a decreased rotational movement of inertia, a stiffer inner and outer radial deflection of the inner and outer rings, a stiffer bearing load, a reduced lateral radial and/or combined run-out, a reduced number of leak paths and/or a reduction in the wheel weight.

DETAILED DESCRIPTION

Figure 1:
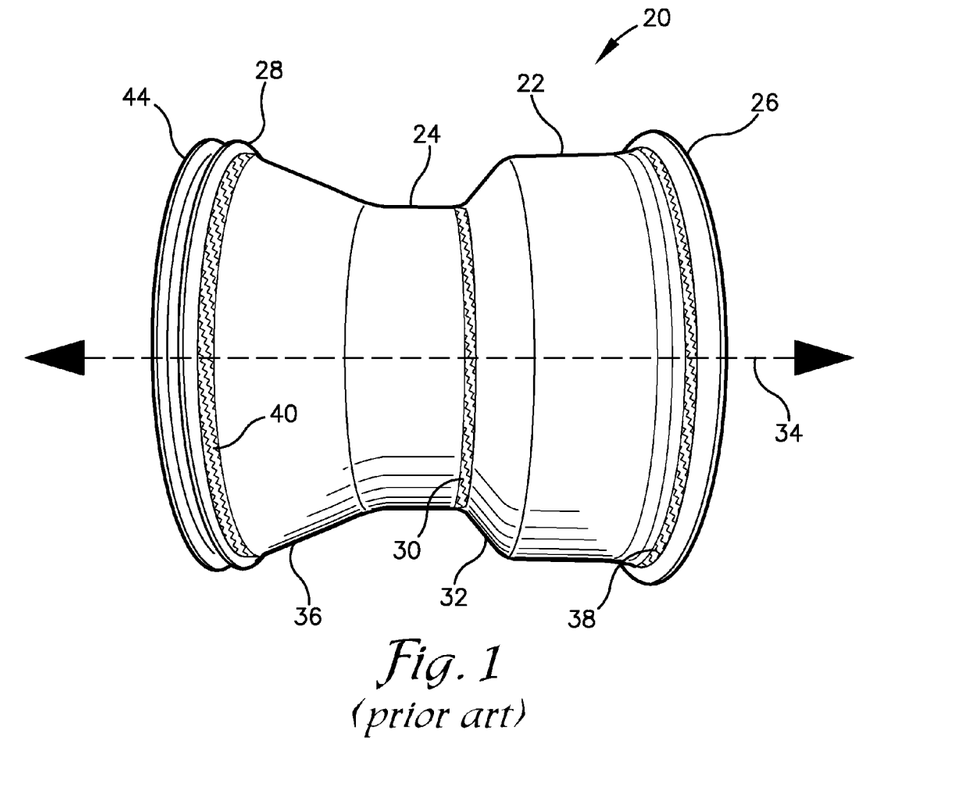
FIG. 1 is a side view of a prior art wheel.
Figure 2:
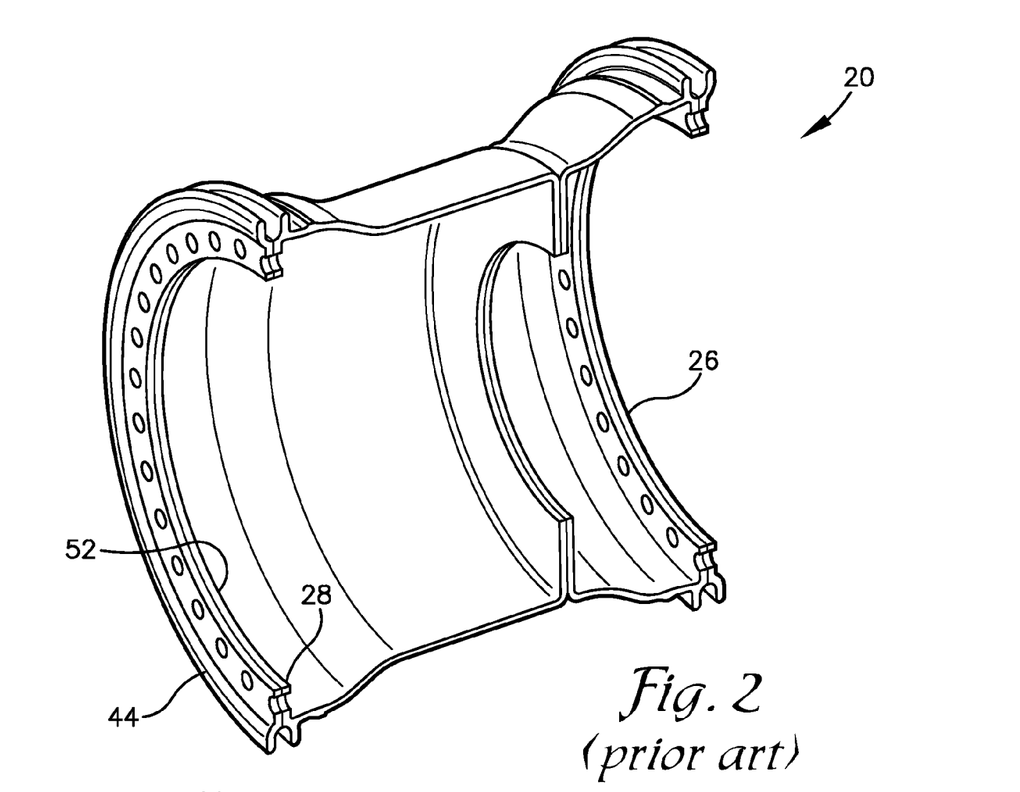
FIG. 2 is a partial cut-away perspective view of the prior art wheel of FIG. 1.
Figure 3:
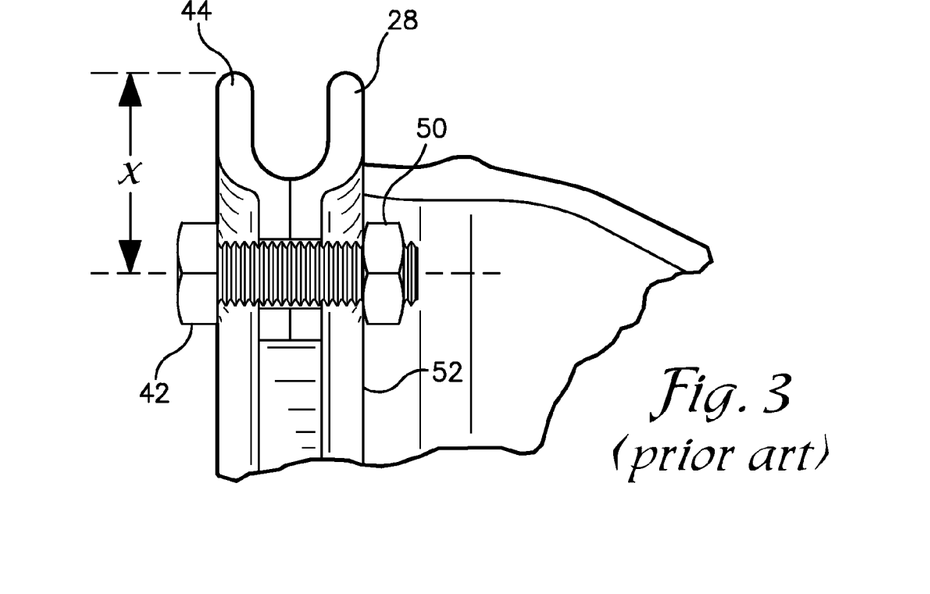
FIG. 3 is an enlarged cross-sectional view of the beadlock of the prior art wheel of FIG. 1.
Figure 4:
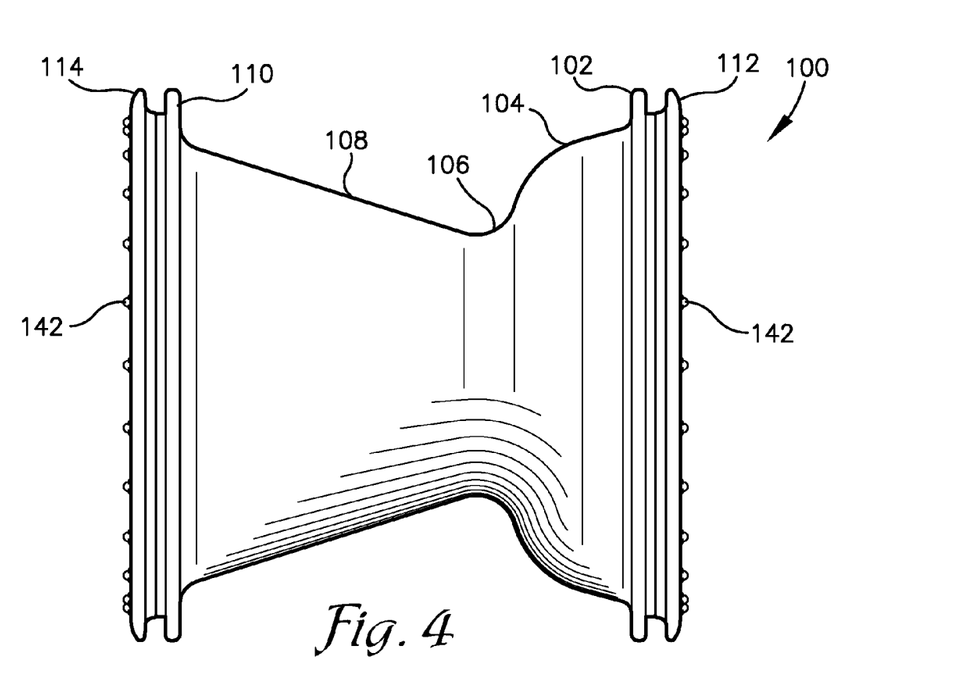
FIG. 4 is a side view of an embodiment of the wheel of the present invention.

Referring initially to FIGS. 1-3, a prior art wheel is identified by reference numeral 20. Prior art wheel includes an inner rim 22, an outer rim 24, an inner beadlock flange 26 and an outer beadlock flange 28. The inner 22 and outer 24 rims may be bolted or welded together along seam 30. The inner rim 22 is generally cylindrically shaped with a tapered end 32 extending axially inwardly to the axis of rotation 34 to mate with the outer rim 24. The outer rim 24 is generally cylindrically shaped with a flared end 36 extending axially outwardly from the axis of rotation 34 to the outer beadlock flange 28. The inner beadlock flange 26 is welded to the inner rim 22 along seam 38 and the outer beadlock flange 28 is welded to the outer rim 24 along seam 40.

The inner 22 and outer 24 rims are typically joined together by rotating the rims about axis 34 and welding along the seam 30. Care must be taken to avoid gaps or holes in the welded seam 30. As the wheel 20 is rotated, the inner 22 and outer 24 rims expand along the seam 30 due to thermal expansion. Slight variations in expansion due to uneven heating and cooling between the rims 22 and 24 may result in stresses being induced in the welded seam 30. Additionally, as the wheel 20 is turned, the work may experience lateral or radial run-out.

Similarly, when beadlock flange 26 is welded to the inner rim 22, the inner beadlock flange 26 may expand more readily or faster than the inner rim 22. This uneven expansion between the inner rim 22 and the inner beadlock flange 26 may result in stresses induced in the weld seam 38 as the parts cool as well as lateral or radial run-out. Likewise, when beadlock flange 28 is welded to the outer rim 24, the outer beadlock flange 28 may also expand more rapidly than the outer rim 24 resulting in stresses induced in the weld seam 40 and lateral or radial run out. Typically, all welded seams are sealed with silicone.

A fastener 42 secures a beadlock ring 44 to the outer beadlock flange 28 of the wheel 20. The fastener 42 passes through axially-aligned holes 46 and 48 in the beadlock ring 44 and outer beadlock flange 28 and is secured in place by a nut 50 on the inside lip 52 of the outer beadlock flange 28. A clamping force from the fastener 42 is transmitted over a distance "x" to the outer periphery of the beadlock ring 44. The distance "x" and deflections in the outer beadlock flange 28 and beadlock ring 44 due to variations in the torque applied in tightening the fasteners 42 and nuts 50, reduces the clamping force applied to the tire bead (not shown) to secure it to the wheel 20.

Referring to FIGS. 4-10, a wheel of the present invention is generally indicated by reference numeral 100. Wheel 100 includes an inner beadlock flange 102, an inner portion 104, a middle portion 106, an outer portion 108 and an outer beadlock flange 110. Fastened to the inner beadlock flange 102 is an inner retention ring 112. Fastened to the outer beadlock flange 110 is an outer retention ring 114.

The wheel 100 may be machined from a solid billet of material, such as aluminum, magnesium and other suitable alloys, for example. The wheel 100 may also be cast or pressure cast. The walls 116 of the inner portion 104 have a uniform thickness. The walls 118 of the outer portion 108 have a uniform thickness also. The one-piece design significantly reduces the potential for air leaks that are found in two- and three-piece wheel designs sealed with silicone.

Figure 7:
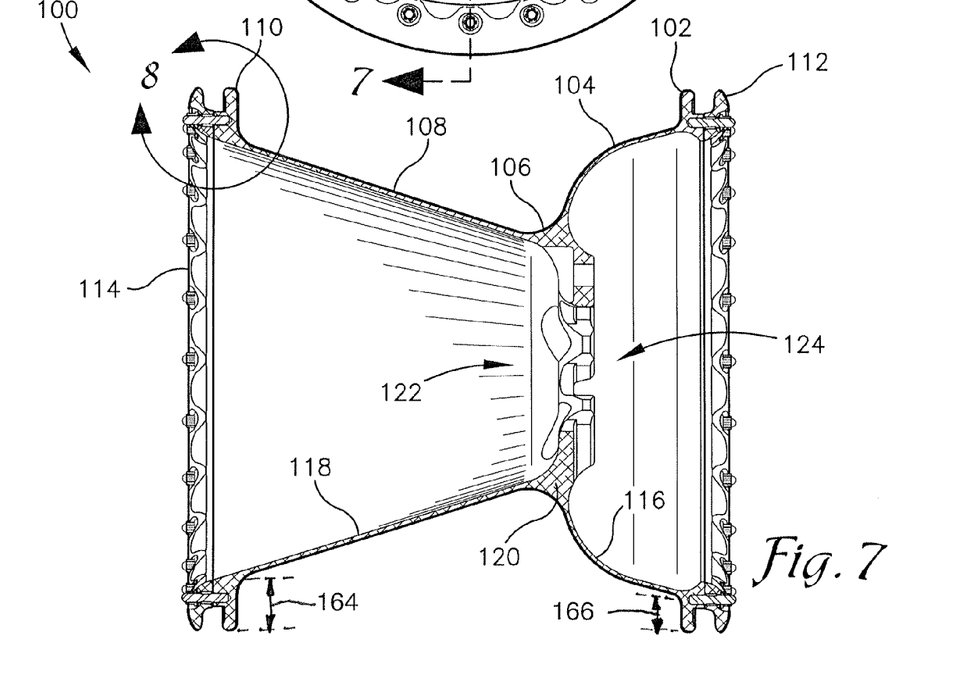
FIG. 7 is a cross-sectional view of the wheel of FIG. 6, along line 7-7.

A shoulder 120 transitions the generally bowl-shaped inner portion 104 through the middle portion, to the frustoconical outer portion 108. The shoulder 120 is thicker than the walls 116 and 118. The thicker material provides strength and rigidity to the wheel 100 to transfer the torque from the hub 122 coupled to a drive shaft of a vehicle (not shown) through the inner 104 and outer 108 portions of the wheel 100 to the tire (not shown).

Figure 5:
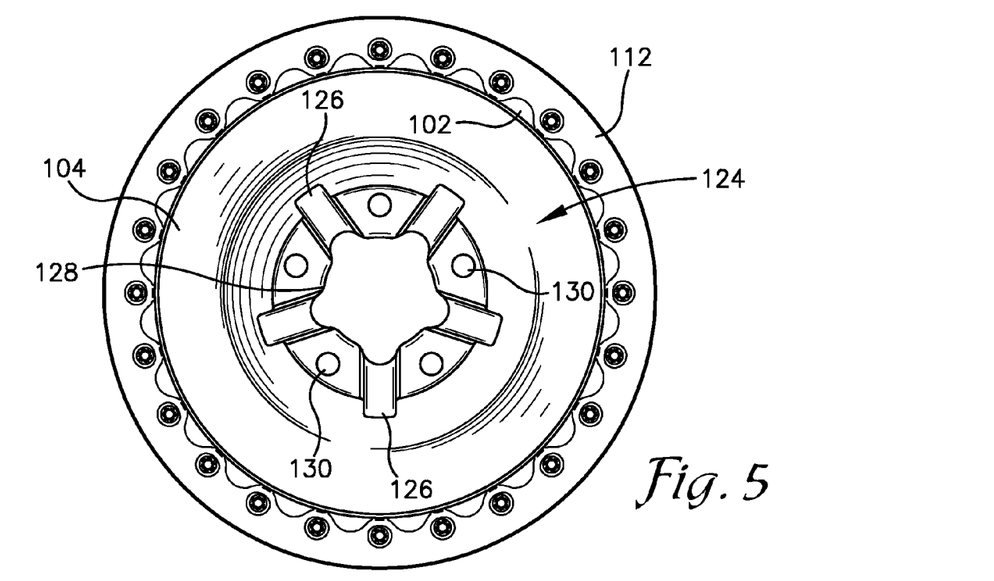
FIG. 5 is an inner end view of the wheel of FIG. 4.
Figure 6:
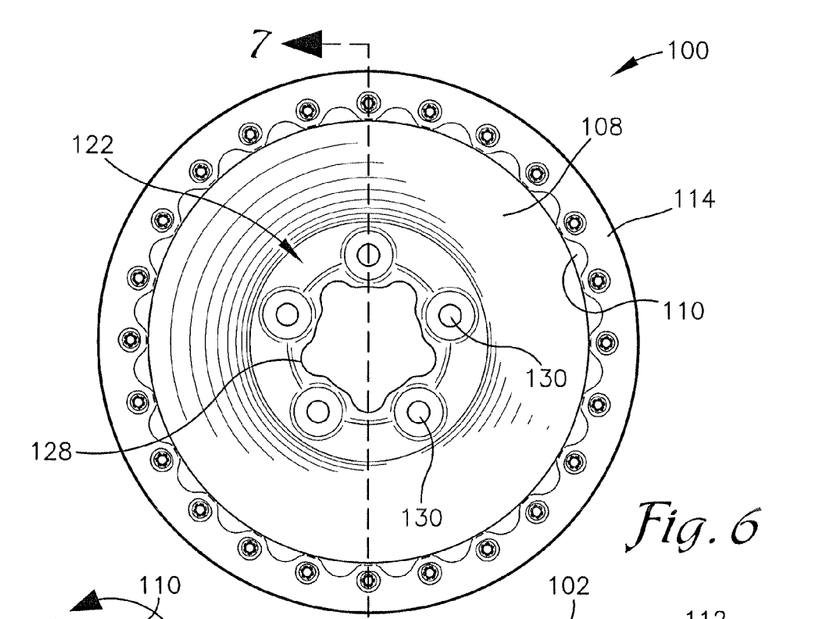
FIG. 6 is an outer end view of the wheel of FIG. 4.

A mounting pad 124 of the hub 122 may include key slots 126 extending radially outwardly from the center bore 128 between radially spaced lug bolt holes 130. The key slots 126 are arranged to receive keys (not shown) extending from the drive shaft of the vehicle (not shown). Likewise, the lug bolt holes 130 are arranged to receive lugs therethrough (not shown) also extending from the drive shaft of the vehicle (not shown). The lugs and associated lug nuts secure the wheel to the vehicle in the conventional manner. The keys engage the key slots 126 to drive the wheel 100 in high performance applications.

Figure 8:
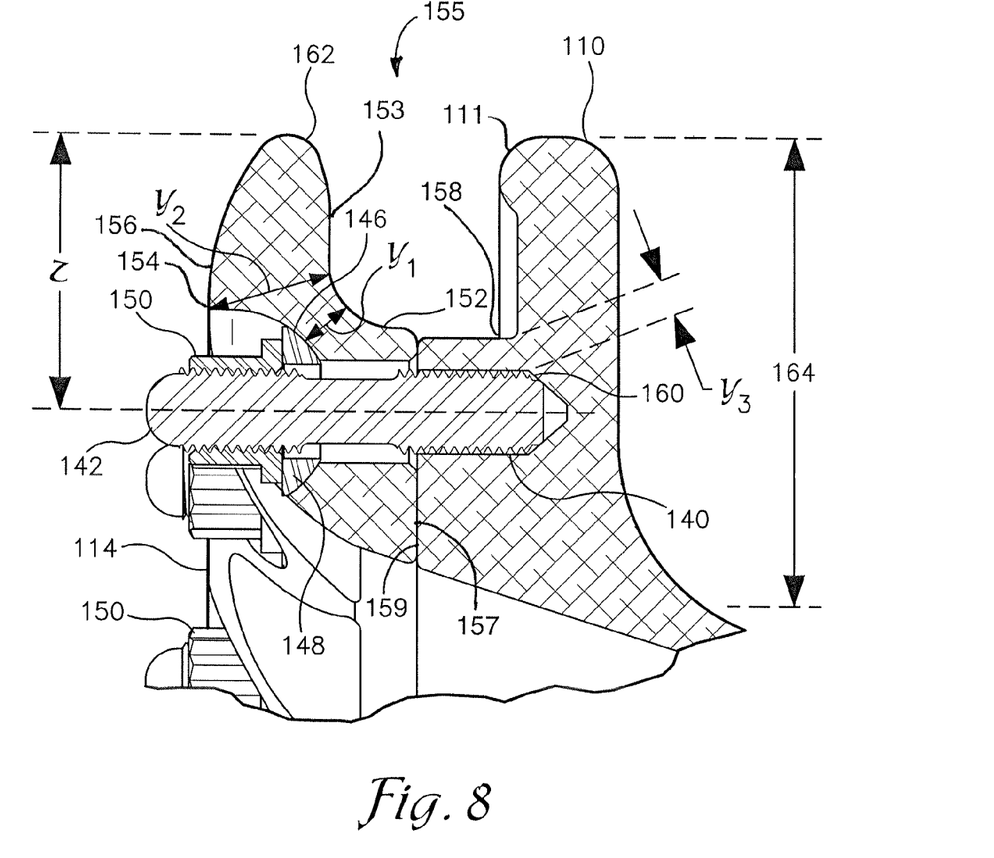
FIG. 8 is a detail view of the wheel of FIG. 7, along line 8-8.
Figure 9:
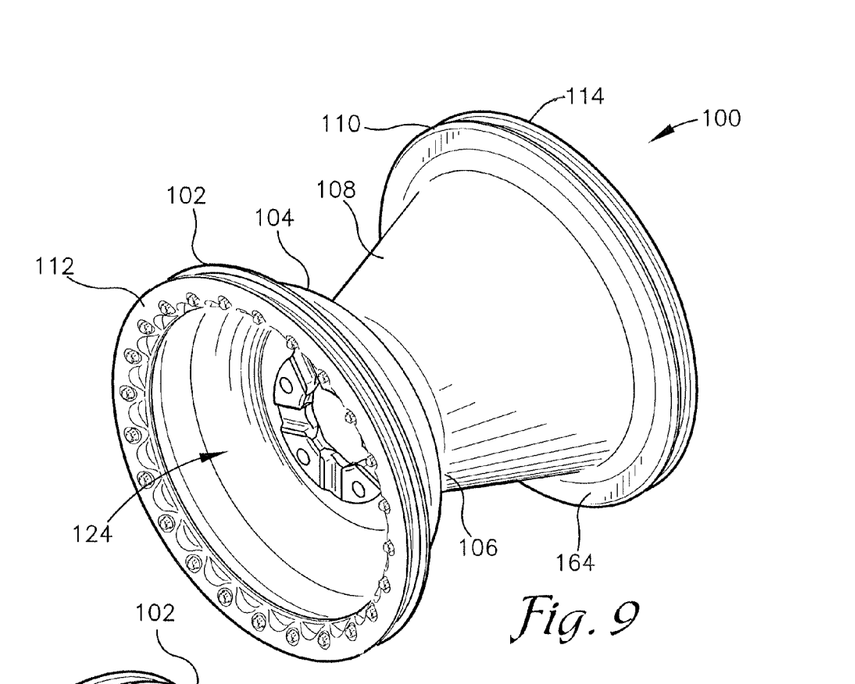
FIG. 9 is an inner end perspective view of the wheel of FIG. 1.
Figure 10:
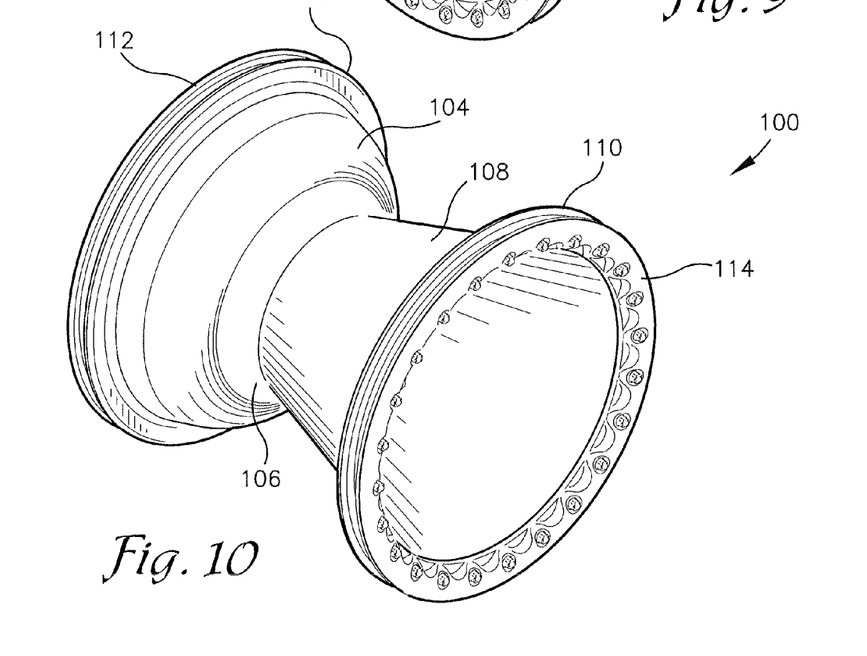
FIG. 10 is an outer end perspective view of the wheel of FIG. 1.
Figure 11:
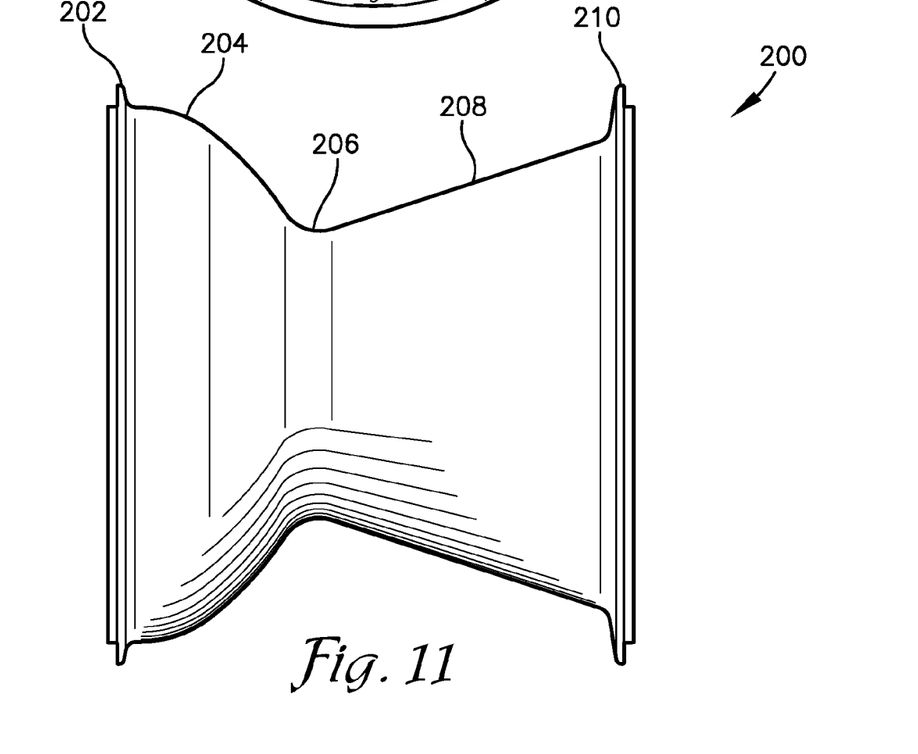
FIG. 11 is a side view of a second embodiment of the wheel of the present invention.

Referring to FIG. 8, a partial cross-sectional view of the beadlock flange 110 and beadlock or retaining ring 114 is shown enlarged to better show and disclose the details. The outer beadlock flange 110 includes a plurality of radially spaced threaded holes 140 each to receive a threaded stud 142 therein. A countersunk bore 144 in the outer beadlock or retaining ring 114 is axially aligned with the threaded hole 140 to receive the threaded stud 142 therethrough. The countersunk bore 146 may be semispherically shaped to receive a semispherical load distributing washer 148. A nut 150 threaded onto the stud 142 secures the outer retaining ring 114 to the beadlock flange 110.

By using a semispherical, countersunk bore 146, the thickness "y1" of the outer beadlock ring 114 from the bottom of the countersunk bore 146 to an inner radius 152 of an outer beadlock channel surface 153 of the outer beadlock ring 114 may be minimized. The inner radius 152 of the outer beadlock channel surface 153 of the outer beadlock ring 114 forms the outer portion of a beadlock channel 155, transitioning from an outer periphery 162 of the ring 114 to a retaining ring mating surface 157. The outer beadlock flange 110 includes a lip 111 transitioning to an inner corner 158 of the beadlock flange to an outer beadlock flange mating surface 159. The thickness "y1" may be about 0.1" to 0.5". The thickness "y2" from the inner radius 152 of a beadlock channel surface 153 to an outer lip 154 of the countersunk bore 146 at the surface 156 of the outer ring 114 may be also minimized. The thickness "y2" may be about 0.2" to 0.7", for example. The thickness "y3" from an inner corner 158 of the beadlock flange 110 to a bottom peripheral edge 160 of the bore 140 may be minimized. The thickness "y3" may be about 0.1" to 0.5", for example. Further the distance "z" from the centerline of stud 142 to the outer periphery 162 of outer retaining ring 114 may be minimized. By minimizing the distance "z" from the fastener 142 to the outer periphery 162 of the outer retaining ring 114, the clamping force applied may be increased over prior art designs. The distance "z" may be about 1.25" to 2.5", for example. By reducing or minimizing the thickness "y1", "y2" and "y3" and distance "z", the amount of material may be reduced or minimized resulting in a lighter weight design and a reduction or minimization of the rotational movement of inertia.

The same configuration and design of the components with respect to the outer retaining ring 114 and the outer beadlock flange 110 may be used for the inner retaining ring 112 and the inner beadlock flange 102, and thus will not be repeated.

The depth 164 of the outer beadlock flange 110 (as well as the inner beadlock flange 102) is increased over prior art designs to allow a tire to be more easily installed on the wheel 100. When installing a tire, the inside tire bead has to be forced over the outer beadlock flange 110. The extra depth 164 of the outer beadlock flange 110 before transitioning to the frustoconical outer portion 108 reduces binding of the inside tire bead and possible damage to the outer beadlock flange 110 from tools used to aid in forcing the inside tire bead over the outer beadlock flange 110. Likewise, the depth 166 of the inner beadlock flange 102 transitioning from the inner portion 104 reduces binding of the inside tire bead when forced over the inner beadlock flange. The possibility of damage to the inner beadlock flange 102 by tools used to aid in forcing the inside tire bead over the inner beadlock flange is also reduced.

Referring to FIGS. 11-16, another embodiment of the present invention is generally indicated by reference numeral 200. Wheel 200 includes an inner beadlock flange 202, an inner portion 204, a middle portion 206, an outer portion 208 and an outer beadlock flange 210. An inner and outer retention ring (not shown) may be fastened to the inner 204 and outer 210 beadlock flanges, respectively.

The wheel 200 may be machined from a solid billet of suitable material, such as aluminum, magnesium, or other alloy, for example. The wheel 200 may also be cast or pressure cast. The walls 216 of the inner portion 204 have a uniform thickness as well as the walls 218 of the outer portion 208.

Figure 14:
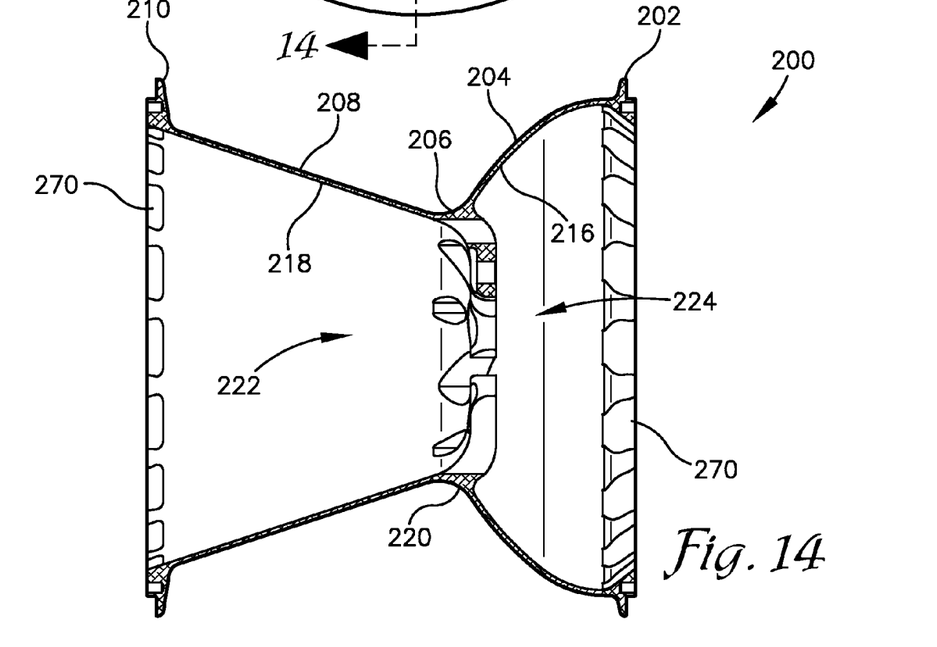
FIG. 14 is a cross-sectional view of the wheel of FIG. 13, along line 14-14.
Figure 15:
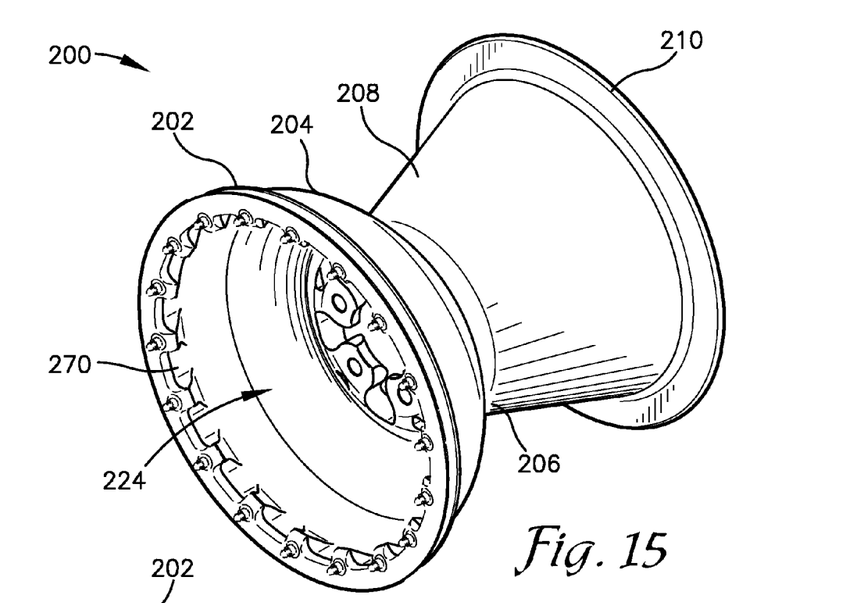
FIG. 15 is an inner end perspective view of the wheel of FIG. 11.
Figure 16:
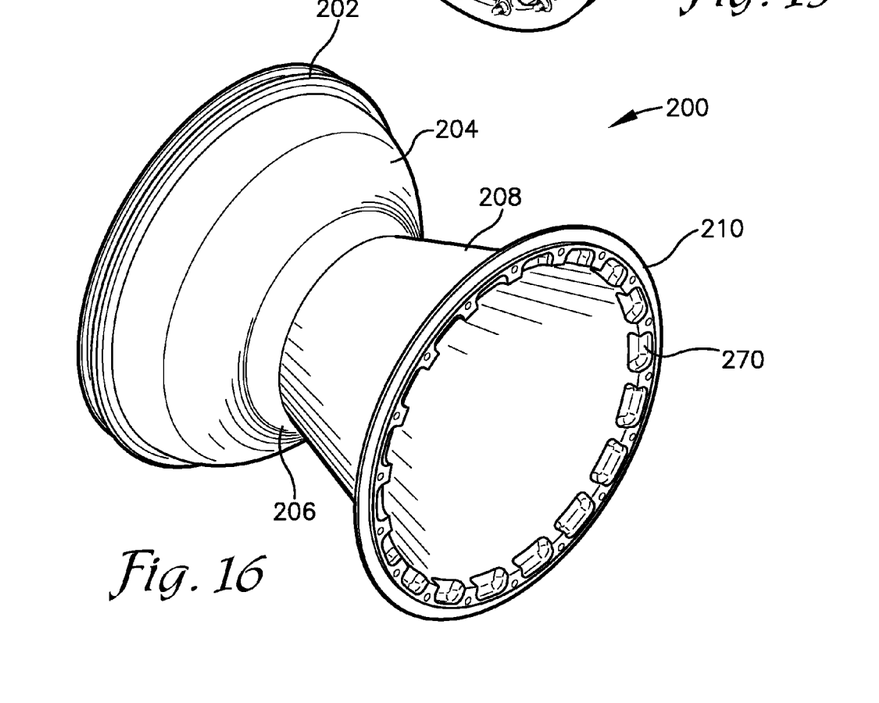
FIG. 16 is an outer end perspective view of the wheel of FIG. 11.

At the middle portion 206 between the inner portion 204 and the outer portion 208, a shoulder 220 transitions the generally bowl-shaped inner portion 204 to a generally frustoconical-shaped outer portion 208. The shoulder 220 is thicker than the walls 216 and 218 to provide strength and rigidity to the wheel 200 to transfer torque from a hub 222 coupled to a drive shaft of a vehicle (not shown) through the inner 204 and outer 208 portions to the tire (not shown).

Figure 12:
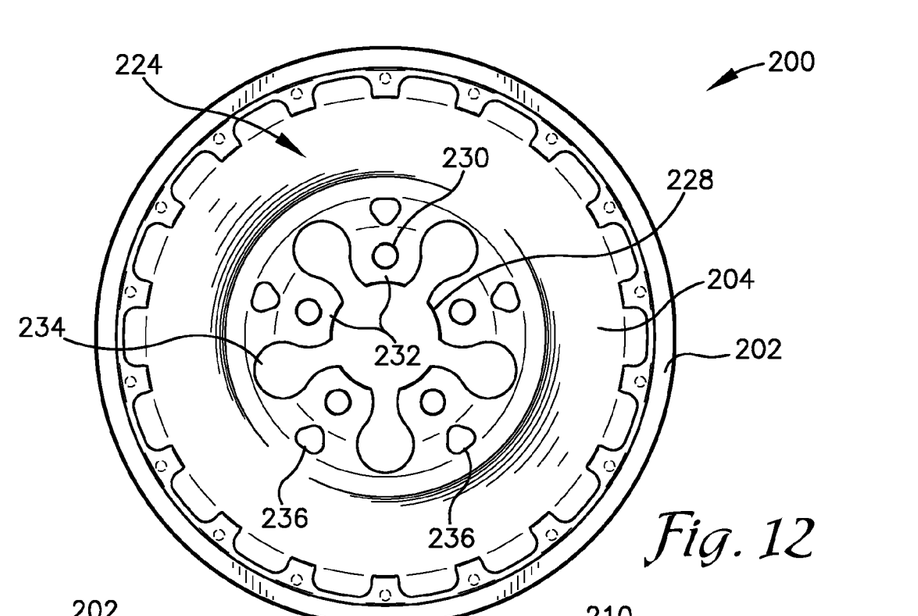
FIG. 12 is an inner end view of the wheel of FIG. 11.
Figure 13:
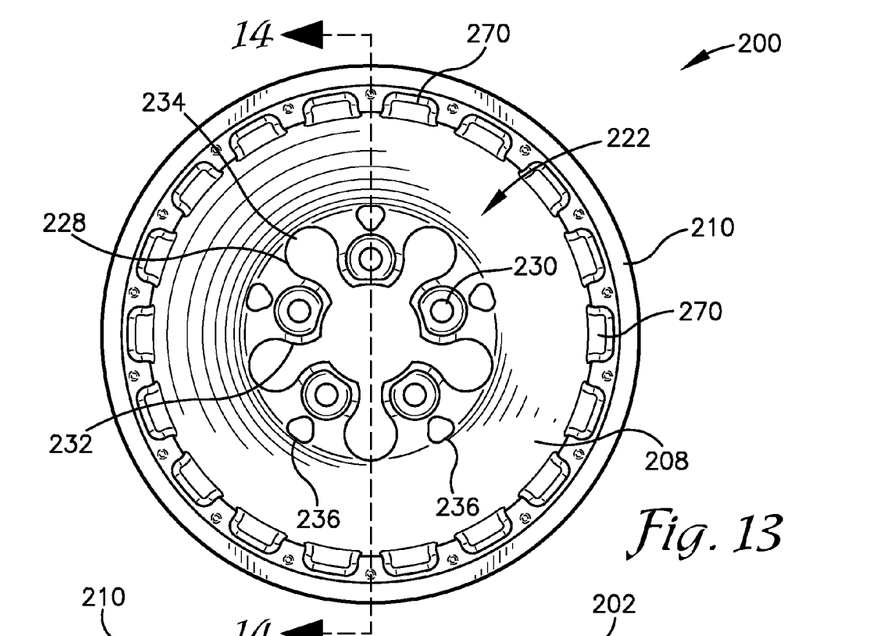
FIG. 13 is an outer end view of the wheel of FIG. 12.

A mounting pad 224 of the hub 222 may include a center bore 228 and radially-spaced lug bolt holes 230, arranged to receive lugs (not shown) extending from the drive shaft of the vehicle (not shown). The lugs and associated lug nuts secure the wheel 200 to the vehicle in a conventional manner. The lug bolt holes 230 may extend through a conventional annular flange mounting pad (see FIG. 5, 124) or may extend through radially-spaced mounting tabs 232 projecting inwardly to the center bore 228. A void 234 between each tab 232 decreases the weight of the wheel 200. One or more apertures 236 may be included in the hub 222 to further reduce the weight of the wheel 200. The apertures 236 may be aesthetically shaped, positioned and/or sized.

It should be understood that the bead clamping design discussed hereinabove for wheel 100 may be used with wheel 200 and thus will not be repeated. The inner 202 and outer 210 beadlock flanges may include weight-lightening pockets 270 to reduce the weight of the wheel 200 and improve performance.

It should be understood that the various features of the wheel 100 and wheel 200 described hereinabove may be utilized in various configurations or combinations and are not limited to the embodiments disclosed. For example, a beadlock flange and retaining ring may be included on only the outside portion of the wheel.

The design features of the wheels 200, compared to prior art designs 100 and 200, may result in a weight reduction of five percent to 30 percent, 50 percent to 95 percent in a rotational movement of inertia reduction of 50 percent to 95 percent, an increased stiffness in the radial deflection of the outer flange of 50 percent to 150 percent, an increased stiffness in the radial deflection of the inner flange of 25 percent to 75 percent, an increased stiffness in bearing load of the outer flange of 15 percent to 50 percent, an increased stiffness in bearing load of the inner flange of five percent to 35 percent, an overall increased bearing load stiffness of 20 percent to 80 percent, a reduction in lateral, radial and combined run-out of 20 percent to 90 percent, and a 30 percent to 80 percent reduction in potential leak paths.

Having thus described the invention, what is claimed as new and desired to be secured by Letters Patent is:

1. A racing wheel comprising:
    an inner beadlock flange extending from an inner portion, an outer beadlock flange extending from an outer portion, and a middle portion between said inner portion and said outer portion,
    said middle portion including a hub adapted to be coupled to a drive shaft of a vehicle, said hub having a plurality of radially-spaced lug bolt holes for receiving a lug bolt therethrough, and a center bore,
    said outer beadlock flange having a plurality of radially-spaced threaded holes each for receiving a threaded stud therein and having a bottom peripheral edge, and
    inner and outer retaining rings,
    said outer retaining ring having an outer surface, an outer periphery, a mating surface opposite said outer surface, a beadlock channel surface transitioning inwardly from said outer periphery to said mating surface, and a plurality of countersunk bores each for receiving one of said plurality of threaded studs therethrough,
    wherein said outer retaining ring and said outer beadlock flange forming a beadlock channel when mated together for securing a beadlock of a tire,
    wherein the minimum thickness of said outer retaining ring measured from one of said countersunk bores to said outer retaining ring beadlock channel surface is between 0.1" and 0.5",
    wherein said hub includes a plurality of key slots extending radially outwardly from said center bore between said lug bolt holes, and arranged to receive keys projecting from the drive shaft of the vehicle.

2. The racing wheel of claim 1, wherein the minimum thickness of said outer retaining ring measured from said outer retaining ring beadlock channel surface to an outer lip of one of said countersunk bores is between 0.2" and 0.7".

3. The racing wheel of claim 1, wherein the minimum thickness of said outer beadlock flange measured from said inside corner of said outer beadlock flange to said bottom peripheral edge of one of said threaded holes is between 0.1" and 0.5".

4. The racing wheel of claim 1, wherein the minimum distance from a centerline of one of said studs to said outer periphery of said outer retaining ring is between 1.25" to 2.5".

5. The racing wheel of claim 1, wherein said countersunk bores are semispherically shaped.

6. The racing wheel of claim 5 further comprising a plurality of semispherical washers having a circumference to match said semispherical countersunk bores to distribute the load from a plurality of nuts engaging said plurality of threaded studs extending from said mating surface of said outer beadlock flange.

7. The racing wheel of claim 1, wherein said inner retaining ring having an inner retaining ring outer surface, an inner retaining ring outer periphery, an inner retaining ring mating surface opposite said inner retaining ring outer surface, an inner retaining ring beadlock channel surface transitioning inwardly from said inner retaining ring outer periphery to said inner retaining ring mating surface, and a plurality of inner retaining ring countersunk bores each for receiving one of a plurality of threaded studs therethrough extending from said inner beadlock flange.

8. The racing wheel of claim 7, wherein the minimum thickness of said inner retaining ring measured from one of said countersunk bores to said inner retaining ring beadlock channel surface is between 0.1" and 0.5".

9. The racing wheel of claim 7, wherein the minimum thickness of said inner retaining ring measured from one of said countersunk bores in said inner retaining ring to said inner retaining ring beadlock channel surface is between 0.1" and 0.5".

10. The racing wheel of claim 7, wherein the minimum thickness of said inner retaining ring measured from said inner retaining ring beadlock channel surface to an outer lip of one of said countersunk bores is said inner retaining ring is between 0.2" and 0.7".

11. The racing wheel of claim 7, wherein the minimum thickness of said inner beadlock flange measured from said inside corner of said inner beadlock flange to a bottom peripheral edge of one of a threaded hole in said inner beadlock flange for receiving one of said plurality of threaded studs extending from said inner beadlock flange is between 0.1" and 0.5".

12. The racing wheel of claim 1, wherein said hub includes a plurality of radially-extending voids between said lugs to reduce the weight of the racing wheel.

13. The racing wheel of claim 1, wherein said inner and outer beadlock flanges include a plurality of spaced-apart pockets to reduce the weight of the racing wheel.

14. The racing wheel of claim 13, wherein said inner and outer retaining rings include spaced-apart pockets to reduce the weight of the racing wheel.

* * * * *